United States Patent [19]

Jaatinen et al.

[11] Patent Number: 6,004,678
[45] Date of Patent: *Dec. 21, 1999

[54] LOW PLATE OUT POLYCARBONATE COMPOSITIONS

[75] Inventors: Marja Jaatinen, Bergen op Zoom, Netherlands; Douglas Meldrum, Hughesdale, Australia

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,984

[22] Filed: Aug. 16, 1996

[51] Int. Cl.$^6$ .............................. C08K 5/34; B32B 17/00
[52] U.S. Cl. ...................... 428/410; 428/412; 524/100; 524/151; 524/153
[58] Field of Search ...................... 524/151, 153, 524/100; 428/410, 412

[56] References Cited

U.S. PATENT DOCUMENTS

| | | | |
|---|---|---|---|
| 3,305,520 | 2/1967 | Fritz et al. | 524/153 |
| 3,558,554 | 1/1971 | Kuriyama et al. | 524/153 |
| 3,892,889 | 7/1975 | Cohnen et al. | 427/160 |
| 4,332,858 | 6/1982 | Saitoh et al. | 428/412 |
| 4,339,502 | 7/1982 | Gerry et al. | 428/412 |
| 4,948,666 | 8/1990 | Paul et al. | 428/334 |
| 5,225,526 | 7/1993 | Fukawa et al. | 524/151 |
| 5,288,778 | 2/1994 | Schmitter et al. | 524/100 |

FOREIGN PATENT DOCUMENTS

| | | | |
|---|---|---|---|
| 1 208 873 | 8/1986 | Canada . | |
| 500 496 A1 | 8/1992 | European Pat. Off. . | |
| 1670951 | 2/1971 | Germany . | |
| 0 110 221 | 8/1987 | Germany | B32B 27/36 |
| 247 480 | 12/1987 | Germany . | |
| 320 632 | 6/1989 | Germany . | |
| 338 355 | 10/1989 | Germany . | |
| 3617978 | 3/1987 | Netherlands | B32B 27/36 |
| 2 028 228 | 3/1980 | United Kingdom . | |
| 2 290 745 | 1/1996 | United Kingdom . | |

OTHER PUBLICATIONS

EP Search Report for European Equivalent Application No. EP 97306214.

*Primary Examiner*—Veronica P. Hoke

[57] ABSTRACT

A polycarbonate composition comprising a polycarbonate, a substituted aryl phosphite and a substituted triazine is extruded as a cap layer with sudstantially no fuming or plate out and is additionally useful in profile or molded products.

10 Claims, No Drawings

LOW PLATE OUT POLYCARBONATE COMPOSITIONS

FIELD OF THE INVENTION

This invention relates to weather resistant panels made from polycarbonate which exhibits low plate out during the extrusion of the panels.

BACKGROUND OF THE INVENTION

Polycarbonate resins are characterized by their transparency, mechanical strength and dimensional stability. These properties make polycarbonate an ideal choice for the preparation of sheets to be used in glazing and other outdoor applications. However, stabilizers and screening agents are required to lengthen the useful life of these sheets. These additives, while effective for the intended purpose cause other problems. Stain resistant panels made from polycarbonate have been described in U.S. Pat. No. 4,948,666, EP 338355, EP 320632 and EP 247480. Other related patents include Canadian Patent 1,208,873 which disclosed a polycarbonate-based panel made resistant to UV radiation. Accordingly, a panel is structured to include a core layer of polycarbonate to which there is adhesively bonded an intermediate UV absorption layer and a cover layer. The purpose of the cover layer is to prevent vaporization of the UV absorber from the intermediate layer. The intermediate, UV-absorption layer may be prepared from polycarbonate and contains derivatives of benzotriazole as UV absorbers. Also noted is German Patent Application 1,670,951 which disclosed polycarbonate molded articles, including ribbons which are rendered resistant to UV radiation by incorporating the bis-benzotriazole compound of the present invention therewith. A method for coating a polycarbonate sheet with a protective layer was disclosed in UK Patent Application 2,028,228. A layer preferably of polymethacrylate and advantageously containing a UV absorber is said to be applied to the sheet by co-extrusion. U.S. Pat. No. 3,892,889 discloses UV stabilized polycarbonate moldings the surfaces of which have been treated with a solution containing a benzotriazole. German DE-OS 3,617,978 discloses co-extruded sheets based on a polycarbonate resin which sheets are covered by a UV absorbing layer made from a branched polycarbonate resin containing the bis-benzotriazole of the present invention. Also relevant is European patent application 110,221 which disclosed a panel consisting of a core layer of polycarbonate containing not more than 0.5 wt. percent of a UV absorber and having on at least one side a coating layer which has been co-extruded with the core and which contains at least 3 percent of a UV absorber. As noted in this prior art, firming of volatile additives and plate out during the extrusion process is a problem which needs to be overcome to provide an extruded sheet without surface imperfections in an environmentally sound process where there is reduced worker exposure to undesirable fumes.

SUMMARY OF THE INVENTION

The polycarbonate composition of the present invention comprising a polycarbonate resin, a substituted aryl phosphite having a melting point of at least 170° C. and a substituted triazine having a melting point of at least 140° C. when extruded exhibits no substantial plate out and substantially no fuming.

The method of reducing plate out during extrusion comprises compounding a composition comprising a polycarbonate resin, a substituted aryl phosphite having a melting point of at least 170° C. and a substituted triazine having a melting point of at least 140° C. and extruding the composition at a melt temperature of the composition of at least 250° C.

DETAILED DESCRIPTION OF THE INVENTION

The polycarbonate of the present invention may be prepared by the melt process by reacting diaryl carbonate with a dihydroxy compound in the melt condition or by the interfacial process from phosgene and dihydroxy compounds by polycondensation (see German DOS 2,063,050; 2,063,052; 1,570,703; 2,211,956; 2,211,957 and 2,248,817 and French Patent 1,561,518 and the monograph, H. Schnell, *Chemistry and Physics of Polycarbonates*, Interscience Publishers, New York 1964).

The polycarbonate resins useful in the practice of the invention are homopolycarbonate, copolycarbonate and terpolycarbonate resins or mixtures thereof. Preferably, the polycarbonate resins have molecular weights of 18,000–200,000 (weight average molecular weight), more preferably 20,000–80,000.

In the present context, dihydroxy compounds suitable for the preparation of the polycarbonates of the invention conform to the structural formulae (1) or (2)

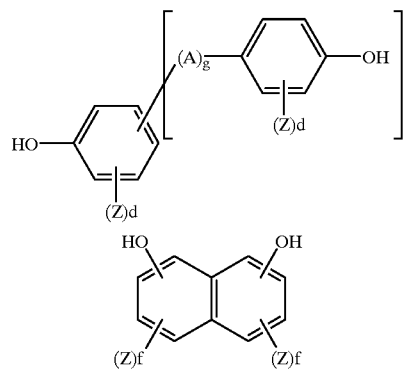

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an or —SO— or —SO$_2$- radical; or a radical of the general formula

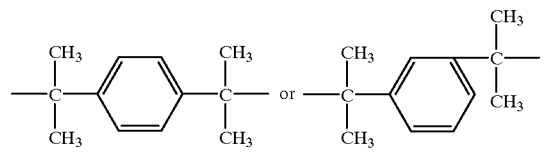

g denotes the number 0 or 1;

e denotes the number 0 or 1;

Z denotes F, Cl, Br or a C$_1$–C$_2$ alkyl and if several Z radicals are substituents in one aryl radical, they may be identical or different;

d denotes 0 or an integer of from 1 to 4; and f denotes 0 or an integer of from 1 to 3. Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxy-phenyl)-ketones, bis-(hydroxyphenyl)-sulfoxides, bis-(hydroxyphenyl)-sulfones and a, a-bis-(hydroxphenyl)-diisopropyl-benzenes. These and further suitable aromatic dihydroxy-compounds are described, for example in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) 1,570,703; 2,063,052; 2,211,956 and 2,211,957, in French Patent Specification 1,561,418 and in the monograph, H. Schnell, *Chemistry and Physics of Polycarbonates*. Interscience Publishers, New York, 1964. Further examples of suitable dihydroxy compounds are 2,2-bis-(4-hydroxyphenyl)-propane (bisphenol A), 2,4-bis-(4-hydroxyphenyl)-2-methyl-butane, 1,1-bis-(4-hydroxphenyl)-cyclohexane, α, α-bis-(4hydroxy-phenyl)-p-diisopropyl-benzene, 2,2-bis-(3-chloro-4-hydroxyphenyl)-propane, hydroxybenzophenone and 4,4'-sulfonyl diphenyl; the most preferred one is 2,2-bis-(4-hydroxyphenyl)-propane (bisphenol A).

The polycarbonates of the invention may entail in their structure, units derived from one or more of the suitable dihydroxy compounds.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention monofunctional reactants such as monophenols, para-cumylphenol, paratertiarybutylphenol and the like may be used in order to limit their respective molecular weights. Branching agents may also be employed in the resin.

Suitable branching agents are those containing 3, 4 or more functional groups in particular those having 3 or more phenolic hydroxyl groups. The quantities in which these are used should be kept within the limits normally observed for branching agents, of from 0.05 to 2 mole-% based on the quantity of chemically-incorporated diphenols.

The following are some examples of suitable branching agents containing three or more phenolic hydroxyl groups: 2,4-bis(4-hydroxyphenyl-isopropyl)-phenol, 2,6-bis-(2'hydroxy-5'methyl-benzyl)4-methylphenol,2-(4-hydroxyphenyl-2-(2,4-dihydroxyphenyl)-propane and 1,4-bis-(4,4'-dihydroxytriphenyl-methyl)-benzene. Other trifunctional compounds include: 2,4-dihydroxybenzoic acid, trimesic acid, cyanuric chloride, 3,3-bis-(4-hydroxyphenyl)-2-oxo-2,3-dihydroindole and 3,3-bis-(4-hydroxy-3-methyl-phenyl)-2-oxo-2,3-dihydroindole.

The branched polycarbonates are prepared by the known methods used for aromatic, thermoplastic polycarbonates namely either transesterification in a solvent-free reaction mixture with diphenylcarbonate or the diphasic interface process with phosgene (see, for example, H. Schnell, Chemistry and Physics of polycarbonates, Polymer Revue, Vol. IX, page 27 et seq, Interscience publishers New York, 1964, and DE-OS 1,570,533, DE-OS 1,595,762, DE-PS 2,500,002, U.S. Pat. No. 3,544,514 and U.S. Pat. No. RE 27,682 (incorporated herein by reference).

According to the present invention UV absorbents and heat stabilizers are added to the linear and branched polycarbonates. They are incorporated in the polycarbonates by means of conventional mixing apparatus, such as rollers, kneaders or single shaft or multi-shaft extruders.

Other, conventional additives, such as reinforcing agents and fillers, flame retardants, dyes, pigments and lubricants and mold release agents, may also be added to the polycarbonate.

The present invention therefore relates also to a process of stabilizing of linear and branched, thermoplastic polycarbonates by adding thereto a substituted aryl phosphite having a melting point of at least 170° C. and a substituted triazine having a melting point of at least 140° C. and optionally reinforcing agents, fillers, flame retardants, dyes, pigments, lubricants and/or mold release agents are incorporated by means of conventional mixing apparatus, such as rollers, kneaders, single shaft extruders, or multi-shaft extruders. Such polycarbonate compositions may also be used to make molded articles.

Glass fibres are preferred reinforcing materials.

The polycarbonate composition of the present invention may be prepared by extrusion in a known manner. It may be clear or pigmented and the thickness of the sheet made from the composition may preferably be in range of from about 0.005" to about 0.3", more preferably the range of about 0.01" to about 0.25" although this is not critical to the invention. Extrusion of polycarbonates to form sheets is known and had been disclosed in the art.

Substituted aryl phosphites useful in the present invention as heat stabilizers have a melting point of at least 170° C., preferably at least 175° C. and more preferably at least 180° C. Preferred substituted aryl phosphites are alkyl aryl phosphites. More preferred alkyl aryl phosphites have the formula

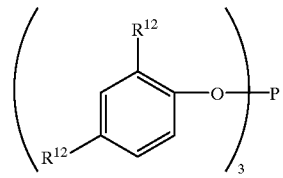

wherein each $R^{12}$ is the same or different alkyl, preferably alkyl of 3 to 7 carbons, and more preferably tertiary butyl. From about 0.005 to about 1 percent by weight of the substituted aryl phosphite is added to the molten polycarbonate.

Substituted triazines useful in the present invention useful as an ultraviolet light absorber (UV absorbent) have a melting point of at least 140° C., preferably at least 144° C., and more preferably at least 148° C. Preferred substituted triazines have the formula

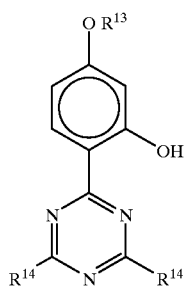

wherein $R^{13}$ is alkyl, preferably $C_4$–$C_8$ alkyl, and more preferably $C_6H_{13}$ and each $R^{14}$ is the same or different aryl, preferably phenyl or alkyl substituted phenyl, more preferably phenyl. From about 1 to about 15 percent by weight of the substituted triazine is added to the molten polycarbonate.

In extruding sheet or profiles according to the process of the present invention the melt temperature of the composition ranges from about 220° C. to about 310° C. preferably from about 230° C. to about 300° C., more preferably from about 240° C. to about 280° C. When extruding the sheet as a cap layer, although the temperature of the melt as it leaves the satellite extrude is about 270° C., it may increase to about 280° C. as it is applied to the base layer.

Polycarbonates which have been stabilized as set forth herein maybe worked-up into fibres, films, plates and injection molded and extruded articles in known manner. Extrusion maybe used, for example, for producing solid plates or multiple plates used as panes in the construction of buildings and greenhouses. According to the present invention, linear or branched polycarbonates containing from 0.05 to 1%, by weight, preferably from 0.2 to 0.8%, by weight, of UV absorbent are used for this purpose.

Another application of the polycarbonates stabilized against UV light according to the present invention is the use thereof in the production of solid or multilayered plastics sheets by the (multiple) coextrusion process in which the weight bearing core is a layer of synthetic resin, for example of ABS or straight-chained or branched polystyrene, preferably branched polycarbonate, which is covered on one or both sides with UV absorption layers of linear or branched polycarbonate containing from 1 to 15%, by weight, preferably from 5 to 10%, by weight of the UV absorbent.

The UV absorption layer should have a thickness of from 10 to 50 μm, preferably from 20 to 40 μm.

A particularly useful application for the composition of the present invention is as a cap layer to provide protection to a base layer from degradation from ultra-violet light. In this application the cap layer and base layer are co-extruded by techniques known to the skilled artisan and their surfaces are brought into contact at an elevated temperature resulting from the extrusion, optionally with the application of pressure, to effect adhesion of the sheet. The known techniques of co-extrusion are extensively described in the prior art and are not a part of the present invention.

The invention is further illustrated, but is not intended to be limited by the following examples in which all parts and percentages are by weight unless otherwise specified.

EXAMPLES

Example 1

The following polycarbonate compositions were prepared by melt blending the ingredients identified in the table below.

|  | A | B | C | D | E | F | G |
|---|---|---|---|---|---|---|---|
|  | (Parts by weight) | | | | | | |
| Polycarbonate | 95.45 | 95.45 | 95.5 | 99.88 | 99.87 | 94.9 | 93.95 |
| 2-(4,6-diphenyl-1,3,5-triazine-2-yl)-5(hexyl)oxyphenol (TINUVIN 1577) | 4.5 | 4.5 | 4.5 | — | — | 5.0 | 6.0 |
| Trisnonylphenyl phosphite | — | 0.05 | — | — | — | 0.1 | — |
| Tris(2,4-di-tert-butylphenyl) phosphite (IRGAPHOS 168) | 0.05 | — | — | 0.05 | 0.05 | — | 0.05 |
| 2(2H-benzotriazol-2yl)-4-(tetramethylbutyl)-phenol (CYASORB UV 5411) | — | — | — | 0.07 | 0.07 | — | — |
| 3,4epoxycyclohexylmethyl-3,4epoxycyclohexylcarboxylate (CEL 2021) | — | — | — | — | 0.01 | — |

The polycarbonate resin used in each of these compositions was a phenol end capped polycarbonate with a weight average molecular weight of from 34,000 to 36,000. When repeated with a para-cumylphenol end capped resin no difference in performance is noted. Accordingly, it is found that any end-capper or no end-capper can be used in the practice of the present invention.

Example 2

Compositions A, B and C were extruded in a simple profile shape at a melt temperature of about 300° C. for 25 minutes to determine the level of fuming. No fuming of composition A was observed. Fuming of composition B was so significant that processing was difficult. Fuming of composition C was observed and degradation of the polycarbonate was observed. It was concluded from this test that only composition A would meet commercial processing standards.

Example 3

Compositions D and E were extruded in a simple profile shape at a melt temperature of about 300° C. for 25 minutes to determine the level of plate out. For composition D plate out was observed sufficient to cause surface imperfections in the profile. For composition E a thick plate out layer was observed. The plate out observed for compositions D and E was sufficient to make these compositions unacceptable for commercial use.

Example 4

Compositions A, F and C were extruded as a cap layer at a melt temperature of 270° C. The extrusion run for A and C continued for 4 hours to observe performance on a commercial scale operation. No plate out was observed for composition C but fuming was substantial at the beginning of the extrusion run and then decreased to a lower steady level. Even at the lower level the fuming was not acceptable. For composition F the extrusion run at 270° C. ended after 2 hours because the fuming was substantially greater than for composition C initially and did not decrease. Composition A had acceptable performance with substantially no fuming or plateout. Only composition A processed acceptably.

Example 5

Compositions A and B were again extruded as in Example 4 except that the melt temperature was 300 to 310° C. Again Composition A extruded with substantially no fuming or plateout and Composition B exhibited unacceptable fuming.

Example 6

Compositions A and G were extruded as a cap layer for 4 hours at a melt temperature of 270° C. for 4 hours to confirm performance on a commercial scale operation. Composition G gave some plateout and fuming. Composition A processed acceptably.

Example 7

Compositions A and G were again extruded for 4 hours as a cap layer in a different commercial operation. The melt temperature was not measured. Composition A gave no substantial plateout or fuming and was considered to process acceptably. However, composition G fumed to an extent it was considered not to process acceptably. It was concluded that composition G, to process acceptably should be extruded at a melt temperature no higher than 270° C. to process acceptably.

Based upon the results of these trials it was concluded that both compositions A and G can meet commercial requirements for low plate out polycarbonate compositions. Thus, the preferred embodiment for general purpose profile and sheet extrusions comprises 100 parts by weight of a branched or linear polycarbonate, from about 1 to about 7 percent by weight more preferably from about 3 to about 6 present by weight of a substituted triazine having a melting point of at least 140° C., and from about 0.005 to about 1 percent by weight, preferably from about 0.03 to about 0.1 percent by weight, of a substituted aryl phosphite having a melting point of at least 170° C. If it is desired to co-extrude the general purpose resin as a cap layer in conjunction with another polycarbonate sheet and if the level of the substituted triazine is above about 5 to about 7 percent by weight, it is preferred to maintain the melt temperature as low as possible commensurate with acceptable surface quality to maintain plate out and fuming within acceptable levels. In the particular conditions of Examples 6 and 7, these conditions would be altered to reduce the melt temperature below 270° C. The skilled artisan operating the extruder will readily determine the proper conditions and melt temperature which achieves the commercially acceptable balance between surface quality and plate out. More preferably, if the polycarbonate resin composition is intended solely for use as a cap layer limiting the maximum level of the substituted triazine to from about 3 to about 5 parts by weight per hundred parts of polycarbonate will enable the cap layer extrusion process to be operated under usual commercial extrusion conditions known to the skilled artisan without plateout or fuming.

However, for merely stabilizing the polycarbonate without other considerations the substituted triazine maybe employed in an amount of from about 1 to about 15 percent by weight.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A method of preparing a multi-layered extruded article which comprises providing a polycarbonate composition comprising
a polycarbonate resin,
from about 0.005 to about 1 percent by weight, based on polycarbonate, of a substituted aryl phosphite of the formula,

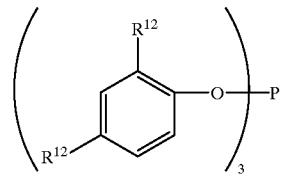

wherein each $R^{12}$ is the same or different alkyl, having a melting point of at least 180° C. and
from about 1 to about 15 percent by weight, based on polycarbonate, of a substituted triazine of the formula,

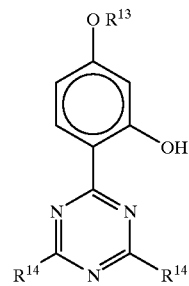

wherein $R^{13}$ is alkyl and each $R^{14}$ is the same or different aryl, having a melting point of at least 148° C.,
extruding the composition at a melt temperature of the composition of from about 230° C. to about 300° C. as a cap layer upon a coextruded base layer of synthetic resin,
simultaneously coextruding the base layer,
bringing the cap layer into contact with the base layer under pressure while each of the layers are at an elevated temperature whereby adhesion between the layers is effected and substantially no plate out and fuming occurs during extrusion.

2. The method of claim 1 wherein $R^{12}$ is alkyl of from 3 to 7 carbons.

3. The method of claim 1 wherein $R^{13}$ is $C_4$ to $C_8$ alkyl and $R^{14}$ is phenyl.

4. The method of claim 3 wherein $R^{13}$ is $C_6 H_{13}$.

5. The method of claim 4 wherein the substituted aryl phosphite is tris (2,4-di-tert-butylphenyl) phosphite.

6. The method of claim 5 wherein the weight average molecular weight of the polycarbonate is from 18,000 to 200,000.

7. The method of claim 1 wherein the cap layer is from 10 to 50 micrometers thick.

8. The method of claim 1 wherein the polycarbonate resin is end capped with phenol.

9. The method of claim 1 wherein the polycarbonate resin is end capped with para-cumyl phenol.

10. A method for making a multilayered article comprising a stabilized linear or branched thermoplastic polycarbonate cap layer comprising 1) adding to a molten polycarbonate, having a weight average molecular weight of from 18,000 to 200,000, from about 1 to about 15 percent by weight of a substituted triazine, of the formula,

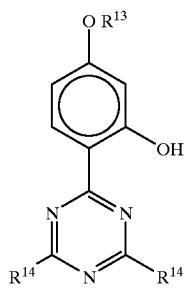

wherein $R^{13}$ is alkyl and each $R^{14}$ is the same or different aryl, having a melting point of at least 140° C. and from about 0.005 to about 1 percent by weight of a substituted aryl phosphite of the formula,

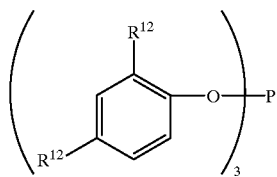

wherein each $R^{12}$ is the same or different alkyl, having melting point of at least 170° C. and 2) mixing the molten polycarbonate, triazine and phosphite until the triazine and phosphite are distributed throughout the polycarbonate to form a polycarbonate composition 3) extruding the composition at a melt temperature of from about 230° C. to about 300° C. as a cap layer upon a coextruded base layer of synthetic resin, 4) simultaneously coextruding the base layer, 5) bringing the cap layer into contact with the base layer under pressure while each of the layers are at an elevated temperature whereby adhesion between the layers is effected and substantially no plate out and fuming occurs during extrusion of the cap layer.

* * * * *